2,304,487

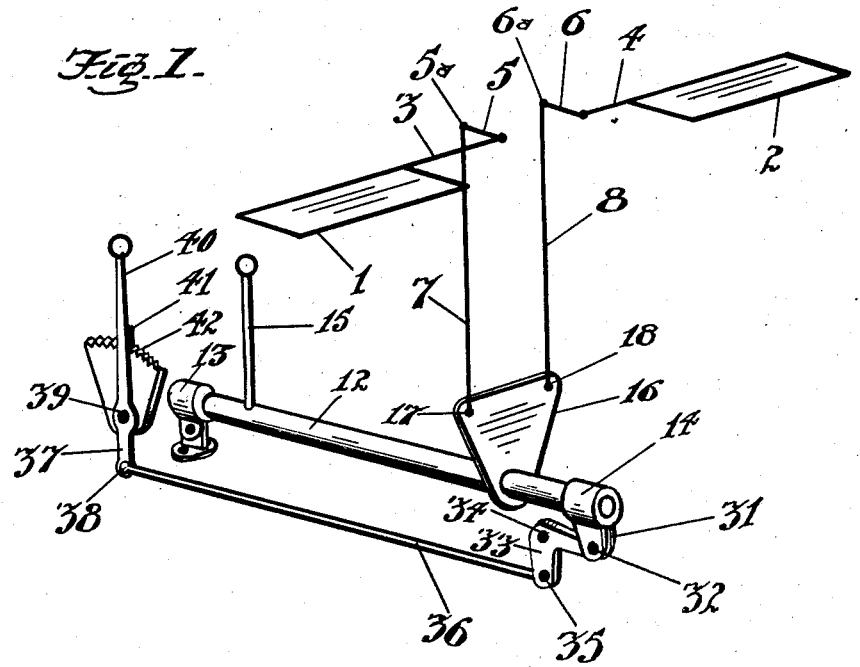
Dec. 8, 1942. J. B. STINSON 2,304,487
CONTROL MECHANISM FOR COMBINATION FLAP AND AILERON FOR AN AIRPLANE
Filed Nov. 20, 1939
INVENTOR
JACK B. STINSON
ATTORNEY Patented Dec. 8, 1942

UNITED STATES PATENT OFFICE 2,304,487

CONTROL MECHANISM FOR COMBINATION FLAP AND AILERON FOR AIRPLANES

Jack B. Stinson, Jackson Heights, N. Y., assignor to Stinson School of Aviation, Inc., Long Island City, N. Y., a corporation of New York Application November 20, 1939, Serial No. 305,341

3 Claims. (Cl. 244—83)

This invention relates to airplane construction, and is particularly concerned with the control of the ailerons mounted in the wings.

In his previous application, filed October 27, 1939, Serial No. 301,527, applicant set forth a differential arrangement for controlling the ailerons to eliminate the unfavorable yaw occurring when a plane is banked for turning, and the present invention while using this same arrangement provides a further development whereby the ailerons may be moved equally and simultaneously without disturbing the differential control. Although in the application referred to above applicant set forth a method for the elevating control of the ailerons which was independent of the differential control, this present application combines the two controls into one, in a very simple manner.

In certain straight flying, or particularly upon landing, the pilot will need to move his ailerons equally and uniformly so as to change the shape of the wings. For instance, in landing, the pilot would want to droop the ailerons of both wings so as to increase the lift of the wing or wings while the plane is decreased in speed. At the same time, in making turns, the pilot would want to use the differential mechanism in order to operate one aileron more than the other.

The present invention relates to the combination of these two movements into a simple arrangement which is very effective and easy to operate.

In order to more clearly disclose the invention, reference is made to the accompanying drawing, in which:

Figure 1 is a diagrammatic perspective view showing the ailerons connected to the control mechanism.

Figure 2 is a diagrammatic perspective view showing the ailerons connected by a push-pull method to the control mechanism.

Figure 3 is a diagrammatic perspective view showing the arrangement as in Figure 1, but with an additional offset control shaft.

Similar reference numerals refer to similar parts throughout the drawing.

In the drawing, 1 and 2 are the ailerons. 3 and 4 are torque tubes to which the ailerons are rigidly attached. 5 and 6 are arms attached rigidly to the torque tubes 3 and 4 respectively. The arms 5 and 6 terminate in universal joints 5a and 6a which in turn engage connecting rods 7 and 8, which are in turn attached to plate 16 at universal joints 17 and 18. The plate 16 is rigidly attached to shaft 12. The shaft 12 is mounted at its forward end in swivel bearing 13, free to rotate, attached to the fuselage of the plane. The rear end of the shaft 12 is mounted in bearing 14, and is free to rotate therein. Attached to bearing 14 is an arm 31 which has a pivot point 32 attached to bell crank 33. Bell crank 33 pivots on a bearing pin 34 attached to the fuselage of the plane. The other pin 35 of the bell crank is attached to rod 36, which at its other extremity attaches to lever 37 at pivot point 38. The lever 37 is pivoted to the fuselage at pivot point 39, and terminates in handle 40 which is provided with a spring catch 41 adapted to engage quadrant 42. Quadrant 42 is rigidly attached to the fuselage.

In Figure 2, exactly the same connections are made through the rods 7 and 8 which are attached to the control rods operating the ailerons 1 and 2. However, in Figure 2 a push-pull type of control for the ailerons is used instead of the torque tube form as shown in Figure 1.

In Figure 3, the same arrangement is shown as in Figure 1, with the exception that an additional offset shaft 20 with control stick 19 is provided, for operating the plate 16. The shaft 20 is mounted in suitable bearings attached to the fuselage of the plane, and has a lever 22 rigidly attached thereto which is connected by rod 24 to the plate 16 at the universal joint 43. It will be noted that the lever 22 is longer than the distance of point 43 from the center of shaft 12. This is for the purpose of increasing the movement of the ailerons with respect to the movement required of control stick 19.

In operation, the pilot is at his controls and desires to droop his ailerons uniformly prior to landing. To do this, he merely pushes handle 40 forward which pivots on pivot point 39 and moves pivot point 38 rearward, thereby moving rod 36 rearward and point 35 in bell crank 33 rearward. Bell crank 33 pivots on point 34 and raises point 32 upward. Pivot point 32 in moving upward raises bearing 14 upward, thereby tilting the entire shaft 12 upward. This forces rods 7 and 8 upward, arms 5 and 6 upward, and rocks torque tubes 3 and 4 towards the rear of the wing and deflects ailerons 1 and 2. Obviously, a reverse motion of the handle 40 toward the rear would tilt the ailerons upward through the same mechanism.

On landing the airplane the nose is tilted up and it is possible to increase the lift by drooping the ailerons simultaneously to the point of stalling, and should the lateral equilibrium of the airplane at that point be disturbed by a gust of wind or other cause, it becomes very necessary to have the differential control of the ailerons to be able to balance or level the plane laterally.

It is possible to reach a position where further drooping of the aileron on the low side does not add additional lift and may even cause the lift to diminish. In this event the differential action increases the raising of the opposite aileron and thereby depresses the wing, correcting and levelling the airplane laterally.

This application is a continuation in part of application Serial No. 301,527, filed October 27, 1939.

Having described the invention, what is claimed as new and is desired to be secured by Letters Patent is:

1. In an airplane comprising a fuselage, a pair of wings attached thereto, a pair of ailerons set in the trailing edge of the said wings; a pair of rotatable shafts similarly mounted in each of the wings and rigidly attached at their outer ends to the ailerons, a pair of operating levers rigidly attached to each of the inner ends of the respective shafts, a rotatable shaft pivotally mounted at its forward end in the fuselage, a cross bar rigidly mounted on the said shaft, manual means to rotate the shaft, a bell crank pivotally mounted in the fuselage, one end of said bell crank being pivotally connected to the rear end of said rotatable shaft, a quadrant lever pivotally mounted in the fuselage, and a connecting link joining the other end of said bell crank and said quadrant lever, and independent tie rods connecting the ends of said levers with the extremities of said cross bar.

2. In an airplane comprising a fuselage, a pair of wings attached thereto, a pair of ailerons set in the trailing edge of said wings; a pair of rotatable shafts similarly mounted in each of the wings and rigidly attached at their outer ends to the ailerons, a pair of operating levers rigidly attached to each of the inner ends of the respective shafts, a rotatable shaft pivotally mounted at its forward end in the fuselage, a cross plate rigidly mounted on the said shaft, manual means to rotate the shaft, a bell crank pivotally mounted in the fuselage, one end of said bell crank being pivotally connected to the rear end of said rotatable shaft, a quadrant lever pivotally mounted in the fuselage, and a connecting link joining the other end of said bell crank and said quadrant lever, and independent tie rods connecting the ends of said levers with the extremities of said cross plate.

3. In an airplane comprising a fuselage, a pair of wings attached thereto, a pair of ailerons set in the trailing edge of the said wings; a pair of rotatable shafts similarly mounted in each of the wings and rigidly attached at their outer ends to the ailerons, a pair of operating levers rigidly attached to each of the inner ends of the respective shafts, a rotatable shaft pivotally mounted at its forward end in the fuselage, an offset cross plate rigidly mounted on the said shaft, manual means to rotate the shaft, a bell crank pivotally mounted in the fuselage, one end of said bell crank being pivotally connected to the rear end of said rotatable shaft, a quadrant lever pivotally mounted in the fuselage, and a connecting link joining the other end of said bell crank and said quadrant lever, and independent tie rods connecting the ends of said levers with the extremities of said offset cross plate.

JACK B. STINSON.